United States Patent [19]
Shimada et al.

[11] Patent Number: 5,197,391
[45] Date of Patent: Mar. 30, 1993

[54] MAGNETICALLY FLOATING CARRIER SYSTEM WITH CARRIAGE BELOW RAIL SUPPORT STRUCTURE AND LOAD ABOVE SUPPORT STRUCTURE WITH BALANCES BETWEEN CARRIAGE AND LOAD

[75] Inventors: Toshiro Shimada; Toshio Minakata, both of Osaka; Tsuneyuki Hayashi; Hiroaki Matsuoka, both of Tokyo, all of Japan

[73] Assignees: Sony Corporation, Osaka; Sumitomo Electric Industries, Ltd., Tokyo, both of Japan

[21] Appl. No.: 794,882

[22] Filed: Nov. 20, 1991

[30] Foreign Application Priority Data

Nov. 20, 1990 [JP] Japan ................... 2-318855

[51] Int. Cl.$^5$ ............................. B60L 13/06
[52] U.S. Cl. .................. 104/284; 104/281; 105/149
[58] Field of Search ............ 104/201, 284; 105/149, 105/199.2

[56] References Cited

U.S. PATENT DOCUMENTS

| 2,198,668 | 4/1940 | Janeway | 105/199.2 X |
| 2,440,746 | 5/1948 | Hereford | 105/199.2 |
| 4,516,505 | 5/1985 | Heidelberg | 104/284 |
| 4,972,779 | 11/1990 | Morishita et al. | 104/281 X |

FOREIGN PATENT DOCUMENTS

| 2511382 | 9/1976 | Fed. Rep. of Germany | 104/281 |
| 126113 | 5/1989 | Japan | 104/281 |
| 138906 | 5/1989 | Japan | 104/281 |
| 222605 | 9/1989 | Japan | 104/281 |

Primary Examiner—Robert J. Oberleitner
Assistant Examiner—S. Joseph Morano
Attorney, Agent, or Firm—Wenderoth, Lind & Ponack

[57] ABSTRACT

A magnetically floating carrier system has a carriage body which is adapted to be floated by the attraction force of floating magnets acting upon the bottom surfaces of rails. The carriage body is driven by a linear motor. The rails are mounted on a framework extending longitudinally to define a track and having one side thereof supported. The carriage body is provided with a support member extending upwards at the other side of the framework to a point above the top surfaces of the framework. A pallet for supporting a load is mounted on the top end of the support member so as to be disposed over the framework. The carriage carries four magnets at front and rear parts thereof which are adapted to exert a force of attraction on the pair of rails. The magnets are mounted at both ends of two beams mounted on front and rear parts of the carriage body for see-saw motions and steering motions.

20 Claims, 5 Drawing Sheets

MAGNETICALLY FLOATING CARRIER SYSTEM WITH CARRIAGE BELOW RAIL SUPPORT STRUCTURE AND LOAD ABOVE SUPPORT STRUCTURE WITH BALANCES BETWEEN CARRIAGE AND LOAD

BACKGROUND OF THE INVENTION

This invention relates to a magnetically floating carrier system suitable for use in transporting articles which are brittle, fragile and susceptible to dust, such as semiconductors, and a carriage thereof.

In a conventional magnetically floating carrier system, a carriage body is driven by a linear motor while the body is kept afloat by floating magnets attracted to the bottom of the rails. The load is suspended with a pair of arms provided at the bottom of the carriage body and adapted to be closed by a spring force or the like.

In this type of carrier system, when the attraction caused by the floating magnets ceases, guide rollers mounted on the carriage body are adapted to be supported on guide rails laid on the ground to prevent the carriage body from falling.

The structure of the prior art system is disclosed in detail e.g. in Japanese Patent Unexamined Publication 1-126113.

In the above-described conventional system, if the arms are not hooked securely, or if shock is applied to the carriage body, e.g. at an emergency stop, the arms might be unhooked, allowing the load to drop.

Also, at a branching point of the track, the guide rails had to be cut off partially to allow the passage of floating magnets or a secondary conductor plate (reaction plate) of a linear motor which is mounted on the carriage body. This might cause the carriage itself to drop. Thus, the prior art system has much room for improvement in connection with safe transportation.

Also, there are the following problems.

1) It is necessary to provide movable arms on the carriage and a mechanism for opening and closing the arms on the ground. Thus, the mechanism for transferring loads tends to be complicated.

2) Because the position and size of the arms are fixed, the size and shape of the article that can be loaded are limited.

3) Movable parts provided on the arms and the carriage, such as a magnet suspension device, or contact portions between guide rollers and rails, are sources of dust. Since the load is located under these dust sources, it is difficult to provide a perfect protection against dust.

SUMMARY OF THE INVENTION

A first object of the present invention is to solve these problems.

In order to transfer a carriage onto another parallel track, to pass the carriage running ahead, or to move it from the main track into a charging station for charging, it has to be moved sideways. In the conventional systems, since the guide rails and the main rails obstruct such sideway movements, the carriage has to be moved sideways together with these rails by means of a traverser. This will not only complicate the structure but increase the dust generating areas.

A second object of the present invention is to prevent these problems as well.

Further, the floating magnets are mounted on beams capable of undergoing see-saw and steering motions for stabilizing floating control and for running on the curved rails. This arrangement causes rolling of the carriage body. The load might incline with such rolling motions.

A third object of the present invention is to prevent the load from being affected by the rolling of the carriage body and thus to achieve stable transportation.

In order to fulfill the first object, the present invention provides an attraction type magnetically floating carrier system wherein rails adapted to have floating magnets attracted thereto are mounted on a framework extending longitudinally along a track and having one side thereof supported, wherein a carriage body is provided with a support member extending upwards at the other side of framework to a point above the top surfaces of the framework, and wherein a pallet for supporting a load is mounted on the top end of the support member so as to be disposed over the framework.

In the above carrier system, in order to fulfill the second object, stators of the linear motor may be mounted in the framework with their front side down and protruding from the bottom surfaces of the framework, with a secondary conductor plate mounted on the carriage body below the rails so as to extend horizontally and to be disposed opposite to the stators.

In order to achieve the third object, a balancer may be provided between the support member and the pallet, the balancer being adapted to turn by gravity to a point where the load on the pallet is balanced in a transverse direction of the framework.

The balancer may comprise bearings supported on the support member and arranged symmetrically with respect to the center of the carriage body, and a rocking frame supporting the pallet and having an arcuate bottom surface supported on the bearings or may comprise frames mounted on front and rear parts of the pallets, the frames being pivotally coupled by pivot shafts to the top end of the support member over the center of the track.

According to this invention, a load is placed stably on the pallet located over the frames (i.e. the load is supported from below). This arrangement provides the following advantages.

1) The load never falls.
2) Since the mechanism for transferring loads is used only for loading and unloading, its structure can be simplified.
3) The size and the shape of the load are not limited.
4) Since the portions where dust is produced are located under the load, the load is prevented from being contaminated by dust.

Also, in the arrangement according to the present invention, the support member can pass a branch portion of the track simply by providing a small gap between the main track and the branches. While the floating magnets are not activated, the pallet descends and rests on the framework at any point of the track, keeping the carriage body suspended therefrom. Thus, the load is prevented from falling.

Further, since the carriage straddles the track, it can be removed from the track simply by shifting it sideways. For such a sideways shift, the secondary conductors of the linear motor have to be located under and in parallel to the rails.

Further, by providing the carriage with the balancer, the pallet can be kept horizontal by the natural balancing function of the balancer even if the carriage body rolls. Thus, the load can be held stably.

The magnetically floating carrier system according to this invention has a pallet supported in a cantilever manner and disposed over the framework defining the track which is supported in a cantilever manner at the opposite side. A load is placed on the pallet. This arrangement can prevent the load and the carriage body from falling off the track and thus make it possible to transport loads safely with increased reliability.

This arrangement also makes it possible to simplify the devices for loading and unloading. Further, the load can be protected against contamination by dust. The range of the load size can be widened.

Further, by providing the secondary conductor plate of the linear motor under the rails to extend horizontally, only the carriage can be moved sideways. This makes it possible to simplify the mechanism for sideways movement and to reduce the number of portions where dust is produced.

Further, the balancer for the pallet can keep the pallet always in its horizontal position by allowing the pallet to move freely relative to the carriage under gravity. Thus, even if it is impossible to prevent the carriage body from rolling by mounting the floating magnets on beams capable of see-saw motions, the balancing of the load can be maintained. This greatly improves the stability in transportation.

BRIEF DESCRIPTION OF THE DRAWINGS

Other features and objects of the present invention will become apparent from the following description taken with reference to the accompanying drawings, in which.

DETAILED DESCRIPTION OF THE PREFERRED EMBODIMENTS

Figure 1:
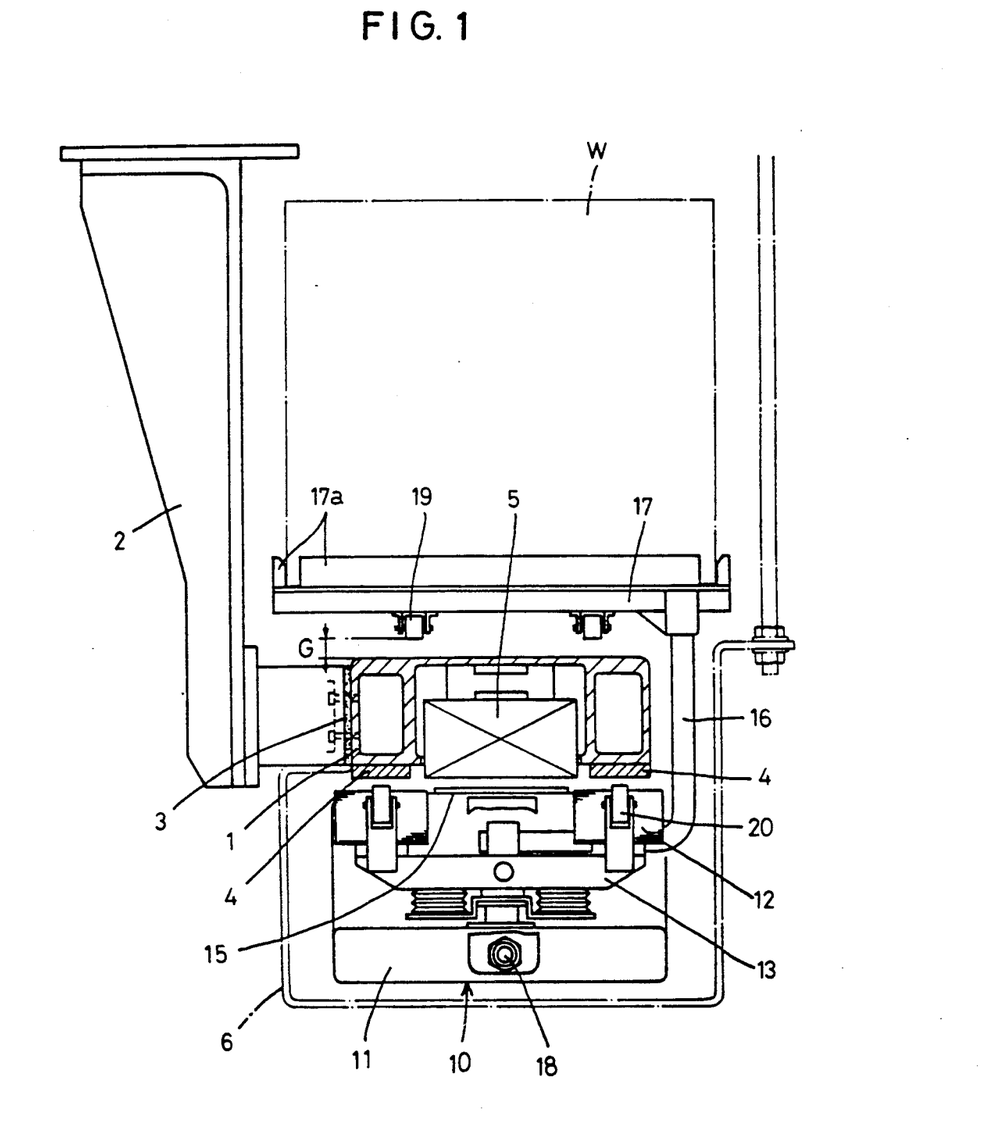
FIG. 1 is a front view of an embodiment of the carrier system according to the present invention.

Numeral 1 in FIG. 1 designates a framework in the form of a unitary member which laid continuously as a track so as to extend in a longitudinal direction of the track. Support structure in the form of brackets 2 suspended from a ceiling or the like is coupled to one side of the framework 1 to support it in a cantilever manner. A shock absorbing material 3 is interposed as necessary between the framework 1 and the brackets 2.

A rail structure in the form of a pair of rails 4 made of a ferromagnetic material are mounted on the bottom of the framework 1 at both sides thereof. They are attracted to floating magnets 12. Stators 5 of a linear motor for generating a driving force in forward and reverse directions are accommodated in a center recess of the framework 1 at predetermined spacings along the track. The stators 5 have their bottom portions protruding from cutouts formed in the bottom of the framework so that their protruding bottom surfaces are substantially at the same level as the bottom surfaces of the rails 4. The framework 1 may not be box-shaped as illustrated. The box-shaped framework is advantageous in that it can be assembled easily and that cables for power supply and control can be passed through cavities thereof.

Figure 2:
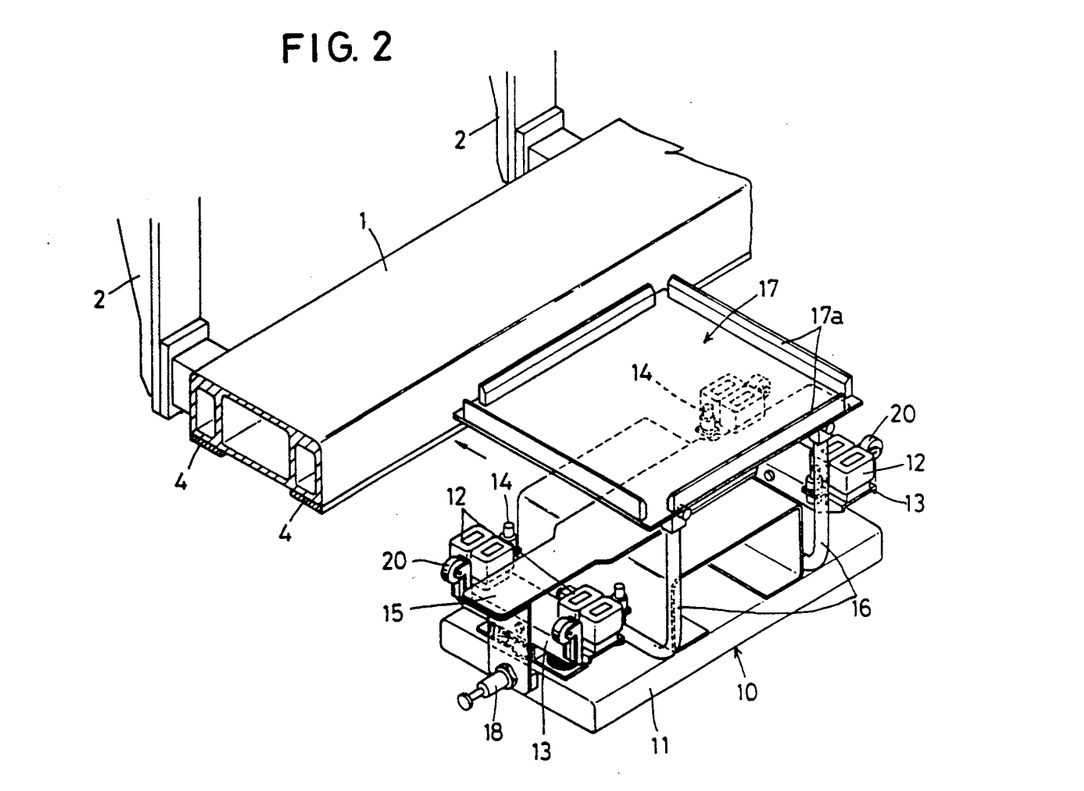
FIG. 2 is a perspective view of the same with the carriage removed from the track.
Figure 3:
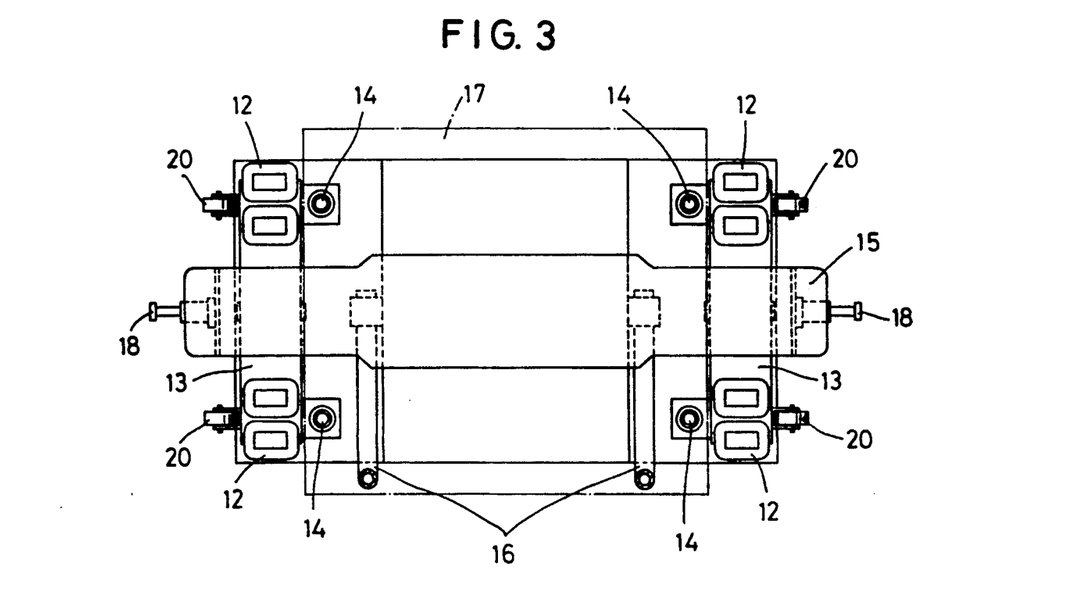
FIG. 3 is a plan view of the carriage.

As shown in FIGS. 2 and 3, a carriage 10 carries four pairs of floating magnets 12 on its body 11, each pair at one of the four corners. Two of the pairs are mounted on each of two beams 13 provided at the front and rear of the body 11 of the carriage 10, respectively. The beams 13 are mounted to make a see-saw motion about a central horizontal axis and a steering motion (horizontal pivoting motion) about a central vertical axis. Gap sensors 14 are mounted on both ends of each beam 13 at the front or rear of the magnets 12 so as to be located opposite to the bottom faces of the respective rails 4.

A secondary conductor plate 15 of the linear motor is fixed to the body 11 so as to extend parallel thereto at substantially the same level as the pole surface of the magnets 12. The conductor plate 15 is preferably of a sufficient length to effect the driving and stopping the carriage 10. For this purpose, in the embodiment, it extends across the beams 13 between the magnets 12 and terminates at the front and rear ends of the body 11.

A support member 16 has one end thereof secured to the body 11 and an outer end extending upwards along the other side of the framework 1 so that its end is located higher than the top surface of the framework 1. A pallet 17 is secured to the top end of the support member 16 in a cantilever manner. The center of the pallet 17 with respect to the direction of width is located right over the center of the body 11 of the carriage to balance the load. The support member 16 is in the form of two struts but instead may be a single bent plate-shaped member. The pallet 17 should preferably be provided along the edge thereof with stoppers 17a to prevent a load W from falling off.

Shock absorbing devices 18 are provided at front and rear ends of the body 11 of the carriage 10 to lessen the shock when a carriage bumps against another carriage from behind. Though these elements are preferable, they may be omitted because the risk of car-to-car collisions is not very high.

A cover 6 as shown by chain line in FIG. 1 may be provided to cover the bottom part of the carriage 10 facing the track. It serves to prevent dust on the track from scattering.

Rollers 19 may be mounted on the bottom of the pallet 17 so that they will land on the frame 1 when they descend a distance G from the elevated position (FIG. 1). With this arrangement, even if the carriage body should move by inertia after it has stopped floating, there will be no friction between the pallet 17 and the frame 1, which is a major cause of the production of dust.

If the cover 6 is provided, the rollers 19 may be mounted on the car body 11 so that they bear on the cover 6. Irrespective of whether the rollers 19 are supported on the frame 1 or on the cover 6, the gap G or the amount of descent of the car body when the attraction force stops should not exceed the range within which the car body can be floated up again by the attraction force of the floating magnets 12.

When it is necessary to stop the carriage immediately at a point where there is no stator, the floating magnets 12 have to be attracted to the rails 4. During such emergency braking, if the pole faces of the magnets 12 contact the bottom surfaces of the rails 4, friction will occur. Thus, rollers 20 should be adapted to abut bottom guide surfaces before the magnets 12 contact the rails 4 to prevent the carriage body from moving further up and thus to prevent the production of dust. In this embodiment, in order to reduce the number of component parts, the bottom surfaces of the rails 4 also serve as the guide surfaces against which the rollers 20 are adapted to abut.

The carrier system according to this invention can prevent the load from falling or from being contaminated because it is mounted on the pallet 17. Also, loading and unloading are easy.

Figure 4:
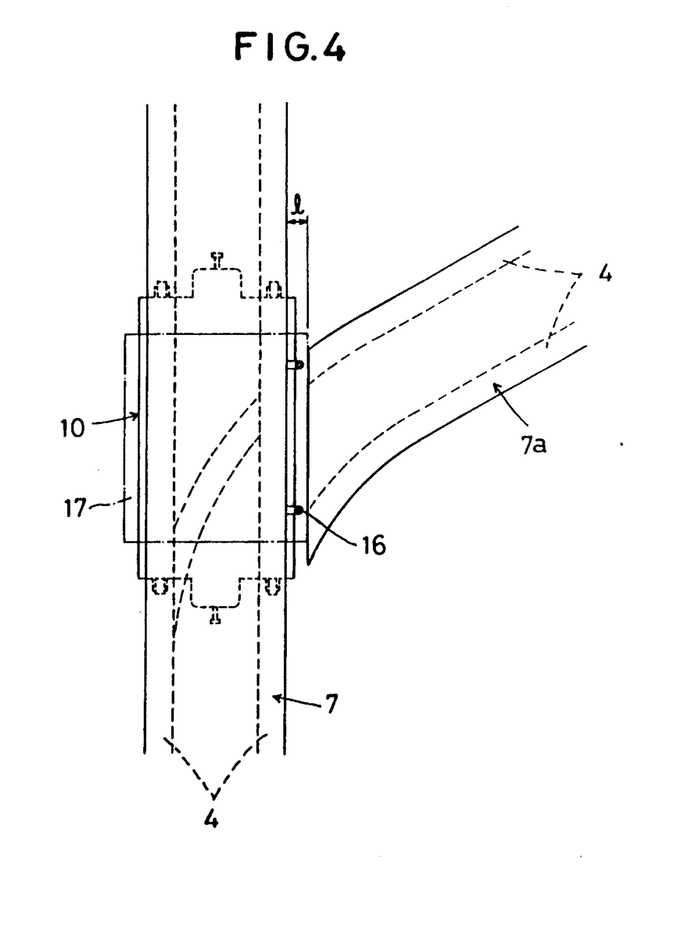
FIG. 4 is a schematic plan view of the system showing a branch of the track.

When the attraction by the magnets stops, the pallet 17 lands on the frame, holding the carriage 10 suspended in the air. Thus, the carriage body 11 will not fall even if no guide rails or guide rollers are provided. FIG. 4 shows a branch portion of the track by way of example. The only requirement for such a branch portion is the provision of a gap l large enough to allow the passage of the support member 16 between the main track 7 and the branch track 7a. Thus, the carriage body will never fall at such branch portions unlike the conventional systems in which the guide rails had to be cut off partially at the branch points.

Figure 5:
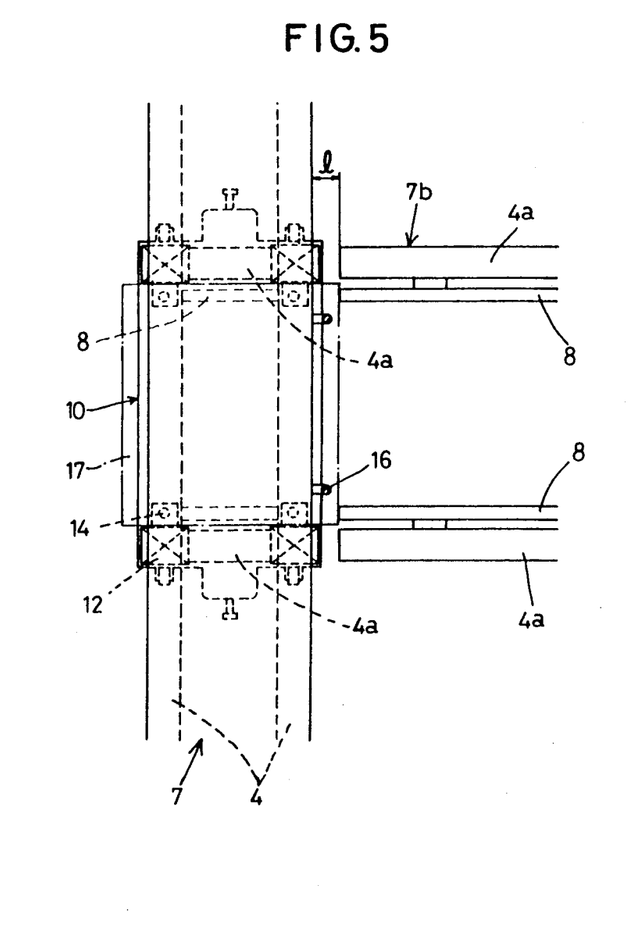
FIG. 5 is a schematic plan view of a side shift portion of the system.

Since the framework 1 and the pallet 17 are supported in a cantilever manner from opposite sides, there will be no restriction whatsoever in moving the carriage 10 to the righthand side in FIG. 1. Thus, as shown in FIG. 5, a carriage 10 can be moved sideways from the main track 7 onto a side track 7b.

To move the carriage sideways, a stator for driving it sideways may be provided to the side of the stator 5 to drive it with the linear motor. Otherwise, the carriage may be pulled with a retractable arm or cylinder.

In order to prevent the carriage 10 from falling after it has moved onto the side track 7b, the pallet 17 may be supported on rails 8 and 4a (according to the positions of the gap sensors, the rails 8 may have to be provided not inside but outside the rails 4a). Otherwise, if the cover 6 is provided, the carriage body 11 may be supported on the cover 6. In the figure, the rails 4a are fixed on the ground, with the rails 8 supported at one side thereof on the rails 4a. The pallet 17 is placed on the top of rails 8.

In another arrangement, the branch track 7a or the side track 7b may be movable so as to eliminate the gap l between the main track 7 and the branch track 7a or side track 7b and thus to stabilize the transition movements.

Next, a carriage provided with a balancer for the pallet 17 will be described.

If, as described above, the floating magnets are mounted on the beams capable of undergoing see-saw motions for stabilizing floating control, the carriage body 11 might roll. If the pallet turns automatically in a direction opposite to the direction of the rolling motion by the same angle as the rolling angle, the pallet will not become inclined.

Figure 6:
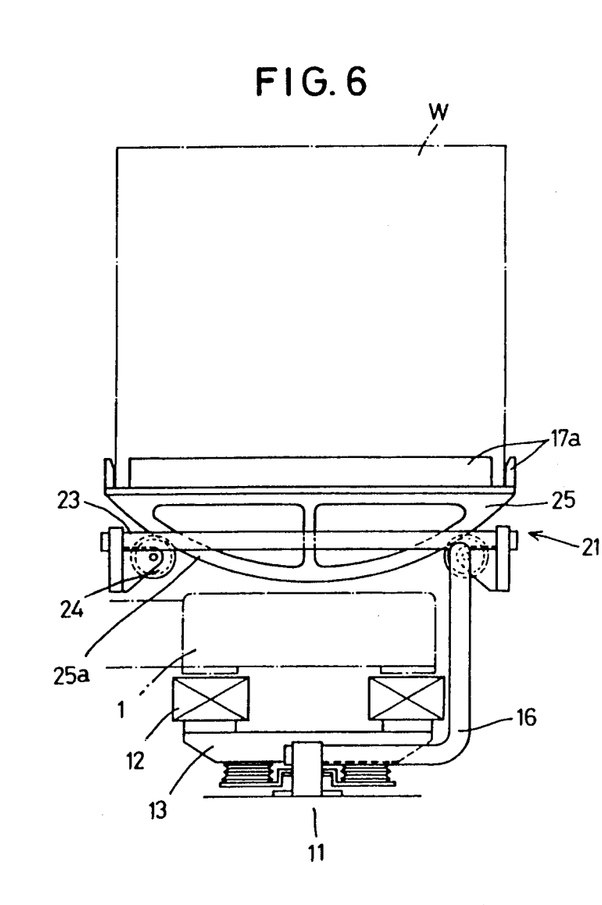
FIG. 6 is a front view of one example of the balancer.
Figure 7:
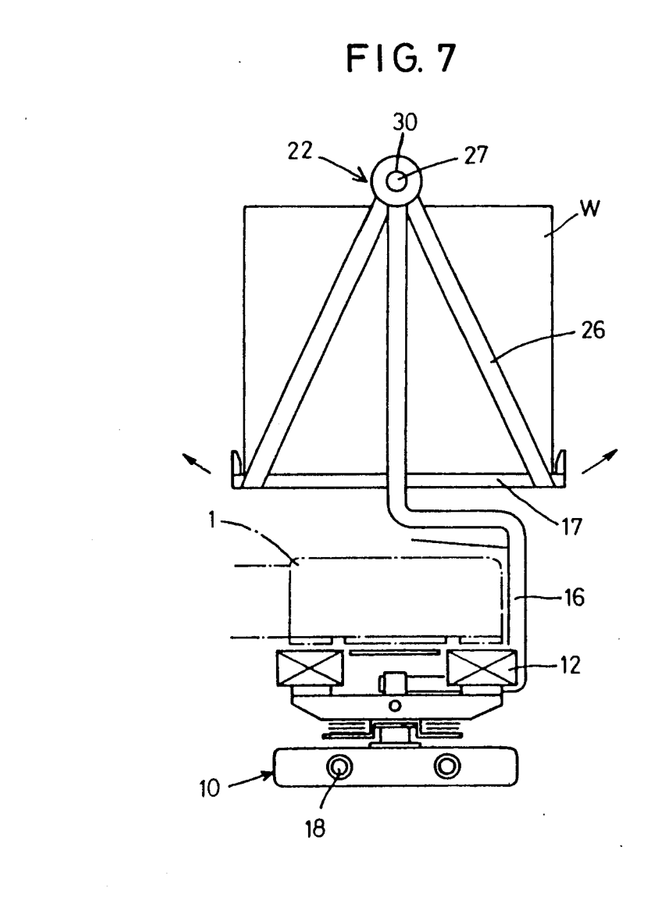
FIG. 7 is a plan view of another example of the balancer.
Figure 8:
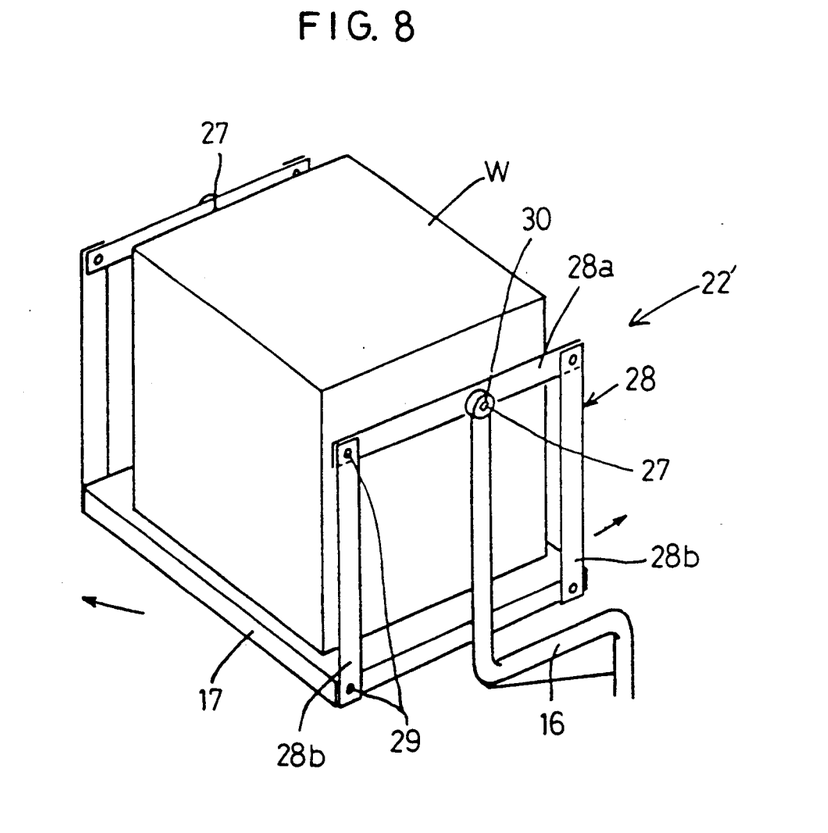
FIG. 8 is a perspective view of a modified form of the balancer of FIG. 7.

FIGS. 6–8 show specific examples of a balancer having an automatic balancing function.

A balancer 21 shown in FIG. 6 comprises a horizontal frame 23 mounted on the top end of the support member 16, and bearings 24 mounted on the frame 23 so as to be symmetrical with respect to the center of the carriage body. A rocking frame 25 carrying the pallet 17 has an arcuate bottom surface 25a, which is supported on the bearings 24. If the carriage body 11 rolls and inclines, the rocking frame 25 will automatically turn sideways by gravity to the point where the load is balanced in the transverse direction, thus keeping the pallet 17 always in its horizontal position.

FIG. 7 shows another type of balancer 22 in which the support member 16 comprises a pair of front and rear struts as shown in FIG. 2. Front and rear suspension frames 26 have their top ends coupled to the top ends of the struts by means of pivot shafts 27, which are provided with seals 30 to prevent the production of dust. The seals 30 include seals covering the friction portions of the shafts 27 and ones for reducing the production of dust itself by reducing the frictional resistance of the shafts. With this arrangement, the portions where dust is produced can be reduced compared with the balancer 21 of FIG. 6.

A balancer 22' shown in FIG. 8 is in the form of a suspension frame 28 comprising transversely movable horizontal links 28a and vertical links 28b hung on both ends of the horizontal links 28a. The frame 28 is supported on the support member 16 by means of shafts 27 at the center of the carriage body. The links 28 are coupled together through coupling means 29 having seals 30 for preventing the production of dust. With this balancer 22', since the pallet 17 can always move horizontally, the influence of the rolling of the load can be reduced compared with the balancers 21 and 22. Also, compared with the balancer 21, the number of portions where dust is produced can be reduced. Further, in the structure of either FIG. 7 or FIG. 8, when the carriage body is rolling, the pallet 17 is turned in such a way that the gravity acts downwards.

In the above embodiments, four magnets were adapted to be attracted to the pair of rails 4. But if the necessary magnetic attraction can be obtained with two floating magnets, such two magnets may be mounted on the top surface of the carriage body at front and back thereof along its transverse center. In such a case, the rail structure may be in the form of a single rail provided in the center of the track with the linear motors provided at both sides thereof.

What is claimed is:

1. A carrier system comprising:
   a longitudinally extending framework defining a track of the system;
   a support structure disposed to one side of said framework and supporting said framework as a cantilever;
   rail structure mounted on said framework and extending longitudinally along the bottom of said framework;
   a carriage body disposed directly beneath and confronting said framework;
   magnets mounted to said carriage body at front and rear portions thereof, said magnets facing said rail structure and cooperable therewith to cause the carriage body to be floatingly supported on said framework;
   a linear motor associated with said carriage body and operable to drive said carriage body along the track defined by said framework;
   a support member extending upwards from said carriage body at the other side of said framework, opposite the side at which the support structure is disposed, to a location above said framework; and
   a pallet supported by said support member and disposed directly above said framework;

said carriage body being moveable transversely of the framework in a direction away from the support structure so that the carriage body can be moved sideways off of said track.

2. A carrier system as claimed in claim 1, wherein said framework is a unitary member, and said rail structure comprises two spaced-apart rails secured to said unitary member at the bottom thereof, and further comprising two beams extending in a transverse direction of the framework at the front and the rear portions of said carriage, respectively, said beams being pivotably supported on said carriage body about horizontal and vertical axes so as to be rockable with a see-saw motion relative to said carriage body and swingable with a steering motion relative to said carriage body about said horizontal and vertical axes, respectively, and wherein said magnets are mounted on each of the ends of said beams. e 3. A carrier system as claimed in claim 2, wherein said linear motor includes a plurality of stators disposed within and mounted to said framework, and stators having front sides facing downwardly and protruding from the bottom of said framework toward said carriage body, and a secondary conductor plate mounted on said carriage body and extending horizontally at a level below said rail structure, said secondary conductor plate facing said framework at a location corresponding to the location where said stators are provided.

4. A carrier system as claimed in claim 3, and further comprising a balancer operatively interposed between said pallet and said support member, said balancer supporting said pallet so as to be freely movable in the transverse direction of said framework, whereby a load on the pallet will be balanced under its own weight by the free movement of said pallet relative to the carriage body in the transverse direction of the framework.

5. A carrier system as claimed in claim 4, wherein said balancer comprises bearings supported on said support member and arranged symmetrically with respect to the center of said carriage body, and a rocking frame supporting said pallet and having an arcuate bottom surface supported by said bearings.

6. A carrier system as claimed in claim 4, wherein said balancer comprises frames mounted to said pallet at opposite sides thereof, respectively, pivot shafts pivotably coupling said frames to the top end of said support member over the center of said carriage body, and dust-preventive seals sealing rotatingly engaged surfaces of said frames and said pivot shafts from the exterior environment.

7. A carrier system as claimed in claim 6, wherein each of said frames comprises a series of links coupled to one another and additional dust-preventive seals sealing coupled portions of said links from the exterior environment.

8. A carrier system as claimed in claim 2, and further comprising a balancer operatively interposed between said pallet and said support member, said balancer supporting said pallet so as to be freely movable in the transverse direction of said framework, whereby a load on the pallet will be balanced under its own weight by the free movement of said pallet relative to the carriage body in the transverse direction of the framework.

9. A carrier system as claimed in claim 8, wherein said balancer comprises bearings supported on said support member and arranged symmetrically with respect to the center of said carriage body, and a rocking frame supporting said pallet and having an arcuate bottom surface supported by said bearings.

10. A carrier system as claimed in claim 8, wherein said balancer comprises frames mounted to said pallet at opposite sides thereof, respectively, pivot shafts pivotably coupling said frames to the top end of said support member over the center of said carriage body, and dust-preventive seals sealing rotatingly engaged surfaces of said frames and said pivot shafts from the exterior environment.

11. A carrier system as claimed in claim 10, wherein each of said frames comprises a series of links coupled to one another and additional dust-preventive seals sealing coupled portions of said links from the exterior environment.

12. A carrier system as claimed in claim 1, wherein said linear motor includes a plurality of stators disposed within and mounted to said framework, said stators having front sides facing downwardly and protruding from the bottom of said framework toward said carriage body, and a secondary conductor plate mounted on said carriage body and extending horizontally at a level below said rail structure, said secondary conductor plate facing said framework at a location corresponding to the location where said stators are provided.

13. A carrier system as claimed in claim 12, and further comprising a balancer operatively interposed between said pallet and said support member, said balancer supporting said pallet so as to be freely movable in the transverse direction of said framework, whereby a load on the pallet will be balanced under its own weight by the free movement of said pallet relative to the carriage body in the transverse direction of the framework.

14. A carrier system as claimed in claim 13, wherein said balancer comprises bearings supported on said support member and arranged symmetrically with respect to the center of said carriage body, and a rocking frame supporting said pallet and having an arcuate bottom surface supported by said bearings.

15. A carrier system as claimed in claim 13, wherein said balancer comprises frames mounted to said pallet at opposite sides thereof, respectively, pivot shafts pivotably coupling said frames to the top end of said support member over the center of said carriage body, and dust-preventive seals sealing rotatingly engaged surfaces of said frames and said pivot shafts from the exterior environment.

16. A carrier system as claimed in claim 15, wherein each of said frames comprises a series of links coupled to one another and additional dust-preventive seals sealing coupled portions of said links from the exterior environment.

17. A carrier system as claimed in claim 1, and further comprising a balancer operatively interposed between said pallet and said support member, said balancer supporting said pallet so as to be freely movable in the transverse direction of said framework, whereby a load on the pallet will be balanced under its own weight by the free movement of said pallet relative to the carriage body in the transverse direction of the framework.

18. A carrier system as claimed in claim 17, wherein said balancer comprises bearings supported on said support member and arranged symmetrically with respect to the center of said carriage body, and a rocking frame supporting said pallet and having an arcuate bottom surface supported by said bearings.

19. A carrier system as claimed in claim 17, wherein said balancer comprises frames mounted to said pallet at opposite sides thereof, respectively, pivot shafts pivotably coupling said frames to the top end of said support member over the center of said carriage body, and dust-preventive seals sealing rotatingly engaged surfaces of said frames and said pivot shafts from the exterior environment.

20. A carrier system as claimed in claim 19, wherein each of said frames comprises a series of links coupled to one another and additional dust-preventive seals sealing coupled portions of said links from the exterior environment.

* * * * *